(12) United States Patent
Stegner

(10) Patent No.: US 12,225,318 B1
(45) Date of Patent: Feb. 11, 2025

(54) TELEPROMPTER SYSTEMS AND RELATED METHODS

(71) Applicant: Corsair Memory, Inc., Milpitas, CA (US)

(72) Inventor: Jeffrey Alan Stegner, Hudson, NH (US)

(73) Assignee: Corsair Memory, Inc., Milpitas, CA (US)

( * ) Notice: Subject to any disclaimer, the term of this patent is extended or adjusted under 35 U.S.C. 154(b) by 34 days.

(21) Appl. No.: 18/368,479

(22) Filed: Sep. 14, 2023

(51) Int. Cl.
 *H04N 5/222* (2006.01)
 *G03B 17/00* (2021.01)
 *H04N 23/00* (2023.01)

(52) U.S. Cl.
 CPC ............ *H04N 5/2222* (2013.01); *G03B 17/00* (2013.01); *H04N 23/00* (2023.01)

(58) Field of Classification Search
 CPC ....... H04N 5/2222; H04N 23/00; G03B 17/00
 See application file for complete search history.

(56) References Cited

U.S. PATENT DOCUMENTS

| | | | | |
|---|---|---|---|---|
| 5,721,586 A * | 2/1998 | Shimamura | ............ | H04N 7/144 348/375 |
| 5,790,194 A * | 8/1998 | Shimamura | .......... | H04N 5/2222 348/375 |
| 6,980,253 B1 * | 12/2005 | Matsui | ................. | H04N 5/2222 348/375 |
| 8,350,960 B2 * | 1/2013 | DeOtte | ................ | H04N 5/2222 348/375 |
| 8,508,614 B2 * | 8/2013 | Segal | ................... | H04N 5/2222 348/222.1 |
| 8,902,355 B2 * | 12/2014 | Dudkowski | .......... | H04N 5/2222 348/375 |
| 9,030,603 B1 * | 5/2015 | Vito | ..................... | H04N 5/2222 348/375 |
| 9,118,824 B2 * | 8/2015 | Vito | ....................... | H04N 23/51 |
| 9,876,845 B2 * | 1/2018 | Chen | ................... | H04L 67/5682 |

(Continued)

*Primary Examiner* — Brian P Yenke
(74) *Attorney, Agent, or Firm* — Carina M. Tan; Corsair Memory, Inc.

(57) ABSTRACT

A teleprompter housing defines an open interior region. A side wall defines an external peripheral boundary of the open interior region. A back wall of the housing defines an opening and a contoured inner perimeter thereof. A removable back plate defines an interface region having a contoured outer perimeter that is complementary with the contoured inner perimeter of the opening defined by the back wall. When mated therewith, the removable back plate, in cooperation with the back wall of the housing, obscures light outside the housing from entering the open interior region through the back face thereof. The removable back plate defines an aperture. A movable mount coupled with the housing permits at least one degree-of-freedom of movement of the camera mount relative to the housing and at least two degrees-of-freedom of camera movement relative to the mount, providing at least three degrees-of-freedom of camera movement relative to the teleprompter housing, providing means to align a field-of-view of the camera to extend from the aperture of the removable back plate, through the open interior region of the housing and through the display to align with a user's gaze upon the teleprompter's display.

33 Claims, 13 Drawing Sheets

(56) References Cited

U.S. PATENT DOCUMENTS

| | | | |
|---|---|---|---|
| 9,876,945 B2* | 1/2018 | Arce | H04N 23/55 |
| 10,148,856 B2* | 12/2018 | Arroyo Martinez | H04N 5/64 |
| 10,270,986 B2* | 4/2019 | Lovemelt | H04N 5/2222 |
| 10,440,263 B2* | 10/2019 | Long | H04N 5/2222 |
| 10,491,785 B1* | 11/2019 | Arnot | H04N 5/2222 |
| 10,674,096 B2* | 6/2020 | Lovemelt | H04N 23/84 |
| 10,931,889 B1* | 2/2021 | Barone | H04N 23/695 |
| 10,972,640 B2* | 4/2021 | Vito | H04N 23/51 |
| 11,300,760 B2* | 4/2022 | Chen | G02B 7/182 |
| 11,533,421 B2* | 12/2022 | Rosensweig | H04N 23/56 |
| 12,160,679 B2* | 12/2024 | Huang | H04N 5/2222 |
| 2002/0030758 A1 | 3/2002 | Wasada | H04N 5/2222 348/375 |
| 2007/0040912 A1* | 2/2007 | Singer | H04N 5/2222 348/207.99 |
| 2009/0256970 A1* | 10/2009 | Bilbrey | H04N 5/2222 348/722 |
| 2010/0182513 A1* | 7/2010 | DeOtte | H04N 5/2222 348/E5.022 |
| 2014/0009686 A1* | 1/2014 | Segal | H04N 5/2222 348/722 |
| 2014/0016030 A1* | 1/2014 | Vito | H04N 5/2222 348/375 |
| 2014/0029186 A1* | 1/2014 | Brinn | H04N 5/2222 361/679.55 |
| 2015/0009402 A1* | 1/2015 | Vito | H04N 5/2222 348/375 |
| 2017/0064158 A1* | 3/2017 | Arce | H04N 5/2222 |
| 2019/0094563 A1* | 3/2019 | Zhang | G02B 5/128 |
| 2020/0014823 A1* | 1/2020 | Chen | H04N 21/47 |
| 2021/0041946 A1* | 2/2021 | De Backer | H04N 5/2222 |
| 2021/0278625 A1* | 9/2021 | Chen | H04N 23/51 |
| 2022/0356989 A1* | 11/2022 | Herst | F16M 11/06 |
| 2023/0138792 A1* | 5/2023 | Gentile | G03B 29/00 348/211.99 |

* cited by examiner

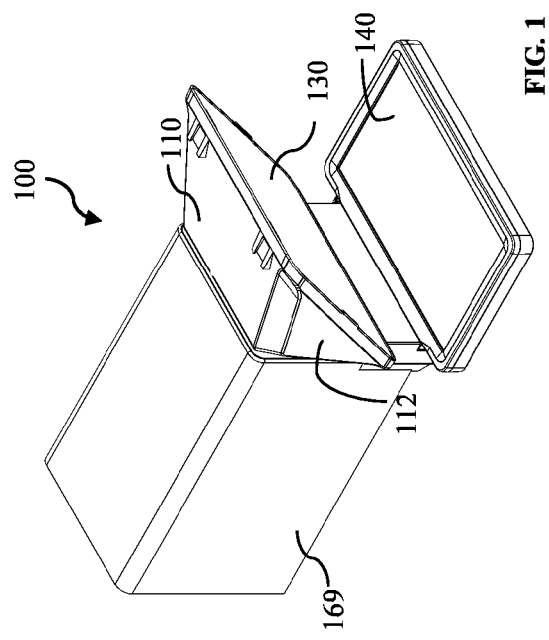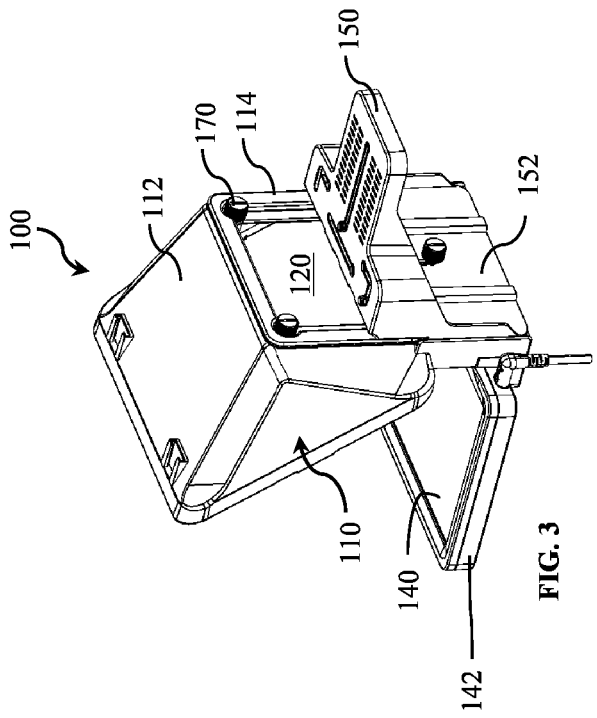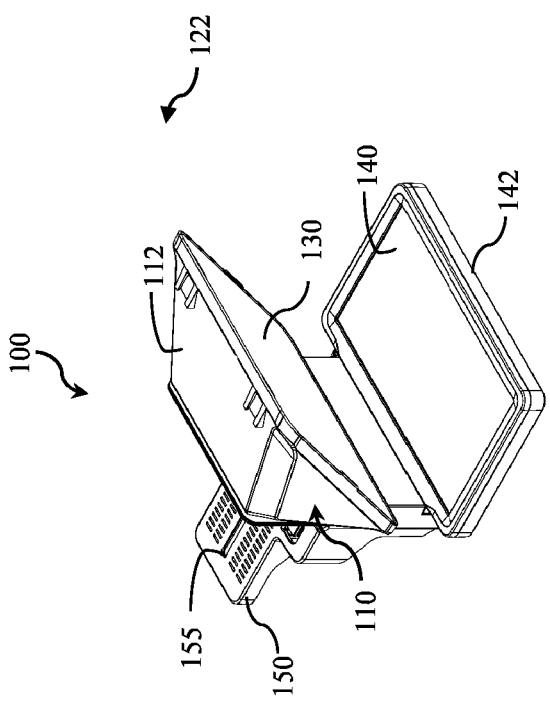

TELEPROMPTER SYSTEMS AND RELATED METHODS

FIELD

This application and the subject matter disclosed herein (collectively referred to as the "disclosure"), generally concern teleprompters, as well as related systems and methods. More particularly, but not exclusively, this disclosure pertains to teleprompters having convenient and easily adjustable features, such as, for example, to accommodate various camera types. As but one illustrative example, some disclosed teleprompters can accommodate a plurality of backplate configurations, each suitable for physically coupling with selected types of cameras.

BACKGROUND INFORMATION

Teleprompters are widely used, e.g., in television production, video recording, live broadcasting, and live streaming, to display textual cues to a presenter while allowing the presenter to give the appearance of maintaining eye contact with a camera. The text is typically projected on a major surface of a glass beam splitter positioned between the camera lens and the presenter. The presenter can view a reflection of the projected text and the camera can receive external light through the beam splitter's major surface. Thus, the camera can view the presenter from behind the beam splitter and the presenter can view the text from in front of the beam splitter. However, existing teleprompter systems are limited in their adaptability to different camera types, sizes, orientations and features.

SUMMARY

Some teleprompters disclosed herein incorporate interchangeable adapters (e.g., backplates) to accommodate a wide variety of camera types, sizes, orientations, and features. Further, some disclosed teleprompters incorporate an adjustable camera-mount, making disclosed teleprompters compatible with a variety of cameras having a wide range of focal lengths. Consequently, disclosed teleprompters can accommodate a wide range of angles-of-view, providing users with a variety of production options that heretofore have been unavailable using a single teleprompter.

In some respects, concepts disclosed herein generally concern teleprompters. Some disclosed concepts pertain to systems, methods, and components that provide adaptability and adjustability to teleprompters. As but one example, some disclosed teleprompters are compatible with a variety of different backplates, each of which can accommodate one or more camera configurations. Further, some disclosed teleprompters include an adjustable camera mount that provides up to four, or more, degrees-of-freedom of movement. For example, a disclosed camera mount can provide up to three degrees-of-freedom of translation and one or more degrees-of-freedom of rotation. Such adjustability allows disclosed teleprompters to accommodate cameras of different physical size and different focal length, as well as to position each different camera lens directly in line with a presenter's gaze while using the teleprompter, giving the presenter the appearance of maintaining eye contact with the camera during use.

According to a first aspect, a teleprompter includes a housing defining an open interior region. The open interior region has a back face and an opposed front face. The housing has at least one side wall defining an external boundary of the open interior region and extending longitudinally from the front face to the back face. The housing also has a back wall corresponding to the back face of the open interior region. The back wall of the housing at least partially defines an opening and a contoured inner perimeter thereof. The back wall of the housing is configured to mate with a removable back plate that defines an interface region. The interface region of the removable backplate has a contoured outer perimeter that is complementary with the contoured inner perimeter of the opening defined by the back wall of the housing, such that, when the contoured outer perimeter of the interface region is mated therewith, the removable back plate, in cooperation with the back wall of the housing, obscures light outside the housing from entering the open interior region through the back face thereof. The removable back plate also defines an aperture.

A display is coupled with the housing and extends across the front face of the open interior region, defining an external boundary of the open interior region. A monitor mount is configured to support a monitor and to orient the monitor transversely relative to the display. A camera mount is so movably coupled with the housing as to permit at least one degree-of-freedom of movement of the camera mount relative to the housing. The camera mount also has one or more adjustable couplings configured to provide at least two degrees-of-freedom of camera movement relative thereto. The adjustable coupling(s) so retain the camera in a selected position and orientation relative thereto as to align a field-of-view of the camera to extend from the aperture of the removable back plate, through the open interior region of the housing and through the display to align with a user's gaze upon the display.

In some embodiments, the back wall defines an external major surface and the contoured inner perimeter defines a shoulder extending around, and laterally outward of, the opening defined by the housing. The shoulder can be recessed from the external major surface of the back wall.

The shoulder can extend partially or entirely around the opening defined by the back plate. In an embodiment where the shoulder extends partially around the opening, it extends from a first end to a second end, leaving a gap in the shoulder between the first end and the second end. The interface surface of the removable back plate can define a tongue configured to seat within the gap in the shoulder. As the tongue rests against the housing wall between the first end and the second end of the shoulder, the housing wall defines a fulcrum for the backplate to align with the back wall of the housing and to rotate into a mating position therewith.

Disclosed teleprompters can also include one or more threaded fasteners. The housing can also define a threaded recess having a thread corresponding to one or more of the threaded fasteners. Such a recess can be so complementary with the thread of the fastener as to permit the fastener and housing to threadably engage with, and to threadably disengage from, each other. In some embodiments, the back plate defines an opening aligned with the threaded recess of the housing when the back plate is in the mating position therewith. One of the fasteners can extend through the opening of the backplate and into the threaded recess. Such a fastener and tongue can retain the back plate in the mating position with the back wall of the housing when the tongue of the back plate is seated within the gap in the shoulder, the fastener extends through the opening of the backplate, and the fastener is threadably engaged with the threaded recess of the housing.

Some embodiments of removable back plates also have an outer perimeter region and a shroud. The shroud can be coupled with the outer perimeter region of the back plate. For example, the shroud can extend longitudinally rearward of the teleprompter from the outer perimeter region of the removable back plate.

In some embodiments, the removable back plate defines an external major surface positioned opposite the rear back face of the open interior region when the removable back plate is mated with the back wall of the housing. A removable back plate embodiment can define a recess from the external major surface. Such a recess can have a floor with a perimeter and recessed wall can extend around the perimeter of the floor from the external major surface to the floor. Further, the floor of the recess can define the aperture of the removable back plate. In some embodiments, the floor of the recess defines a shoulder around the aperture. The shoulder can protrude from the floor of the recess in a direction away from the open interior region of the housing. In some embodiments, the recess is configured to removably engage with a camera in such a manner that the camera's angle-of-view extends through the aperture in the floor and is aligned with a presenter's gaze when and while the back plate is in the mating position and the presenter reads text projected onto the display from the monitor.

In some embodiments, the removable backplate is configured to couple with one or more interchangeable camera adapters. For example, the backplate can have one or more resiliently movable bosses configured to urge inwardly relative to the aperture in the back plate from an outermost position to an innermost position.

The movable bosses can retain a camera adapter (e.g., a so-called "step-up ring") with the removable backplate. For example, the external major surface can define a recessed track positioned outward of the aperture through the plate and extending at least partially around the aperture. The back plate can also have a back-plate cap having a channel therein. The back plate cap can have a shape complementary to the recessed track and can be positioned therein. The resiliently movable boss can be movably captured between the recessed track and the back-plate cap. Moreover, the removable back plate can have an interior wall and a resiliently compressible spring positioned within the channel defined by the back-plate cap. The resiliently compressible spring can be positioned between the resiliently movable boss and the interior wall, such that the resiliently compressible spring urges the resiliently movable boss away from the internal wall and inward toward an interior of the aperture.

In some embodiments, the recessed track is a U-shaped track defining an interior region that extends around the aperture of the back plate such that the aperture is positioned within the interior region of the U-shaped track.

The external major surface of the back plate can define a flange region extending around the aperture of the back plate between an outer perimeter of the aperture and the recessed track. A step-up ring can have an outer flange sized to mate with the flange region of the back plate. The resiliently movable boss and the step up ring can be so complementarily configured that the resiliently movable boss retains the step-up ring with the back plate when the outer flange of the step-up ring is mated with the flange region of the back plate and the resiliently movable boss is in the innermost position. For example, the step-up ring can define a detent and, in the innermost position, the resiliently movable boss can be positioned within the detent of the step-up ring, thereby retaining the step-up ring with the back plate. In another embodiment, the step-up ring can be positioned between the flange region of the external major surface and the resiliently movable boss when the resiliently movable boss is in the innermost position, thereby retaining the step-up ring with the back plate.

The step-up ring can also be configured to removably affix to a camera having an angle-of-view in such a manner that the camera's angle-of-view is aligned with a presenter's gaze when and while the back plate is in the mating position, the outer flange of the step-up ring is mated with the flange region of the back plate, and the presenter reads text projected onto the display from the monitor.

In some embodiments, the camera mount has a first major surface and a second major surface oriented transverse relative to the first major surface. The first major surface can be movably couplable with the housing and the second major surface can define a slotted track, e.g., for providing a camera with an adjustable mounting surface. For example, the first major surface can be oriented substantially vertically when and while the camera mount is coupled with the teleprompter. The second major surface can be oriented substantially horizontally when and while the camera mount is coupled with the teleprompter.

The slotted track can be a first slotted track, and the second major surface can define one or more other slotted tracks. The camera mount can also include a fastener having a body and a threaded stud. The threaded stud can be sized to extend transversely through the slotted track and from the second major surface, providing a mounting location for a camera. The fastener can be movable to and fro within the slotted track, providing an adjustable camera-mounting location.

In some embodiments, the slotted track is straight. In other embodiments, the slotted track is an L-shaped slotted track having a first segment extending longitudinally relative to the teleprompter and a second segment extending transverse to the first segment.

The aperture through the backplate can have a centroid and the first segment of the slotted track can be laterally offset from a plane oriented orthogonally to the second major surface of the camera mount and extending through the centroid of the aperture. In another track embodiment, the first segment of the slotted track defines a longitudinal axis lying within a plane oriented orthogonally to the second major surface of the camera mount and extending through the centroid of the aperture.

Methods of operating a teleprompter as described are also described. Such a teleprompter can have, for example, a display, a camera mount, and a housing defining an open interior region. The housing can have a backwall partially defining an opening extending therethrough and a boundary of the interior region. The housing can define an interface region extending at least partially around the opening. The teleprompter can have a removable backplate having an interface region that is so matable with the interface region of the housing as to obscure light external to the housing from entering the open interior region through an interface between the interface region of the housing and the interface region of the backplate. The backplate can define an aperture.

To operate such a teleprompter, a camera can be mounted to the camera mount at a selected position and in a selected orientation relative thereto in a manner that extends the camera's field-of-view through the aperture of the removable back plate, through the open interior region of the housing and through the display in alignment with a user's gaze upon the display. Text another image cue can be projected on the display.

The removable backplate can be selected from among a plurality of removable backplates in accordance with one or more features of the camera. The removable backplate can be coupled with the backwall of the housing. The act of coupling the removable backplate with the backwall of the housing can include mating the interface region of the backplate with the interface region of housing and retaining the backplate in the mated arrangement with the backwall of the housing with a fastener.

In some embodiments, a step-up plate can be removably affixed to the camera and the step-up plate can be coupled with the removable back plate.

During operation, the selected orientation of the camera can be adjusted responsive to a change in the user's gaze upon the display.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

FIG. 1 is a top front perspective view showing a teleprompter, including a shroud.

FIG. 2 is a top front perspective view showing the teleprompter in FIG. 1 with the shroud removed.

FIG. 3 is a top rear perspective view of the teleprompter as in FIG. 2.

DETAILED DESCRIPTION

The following describes various principles related to teleprompters. For example, some disclosed principles pertain to teleprompter adapters compatible with a variety of different camera types, sizes, orientations, and features. Further, some disclosed principles pertain to adjustable camera mounts that further extend the compatibility of teleprompters across a range of focal lengths, as well as to different presenters that tend to gaze at different locations on the teleprompter screen. That said, descriptions herein of specific embodiments are but particular examples chosen as being convenient to illustrate disclosed principles. One or more of the disclosed principles can be incorporated in various other embodiments to achieve any of a variety of corresponding system characteristics, as will be clear from a review of this disclosure.

Thus, systems having attributes that are different from those specific features discussed herein can embody one or more presently disclosed principles, and can be used in applications not described herein in detail. Accordingly, such alternative embodiments also fall within the scope of this disclosure.

I. Overview

Figure 4:
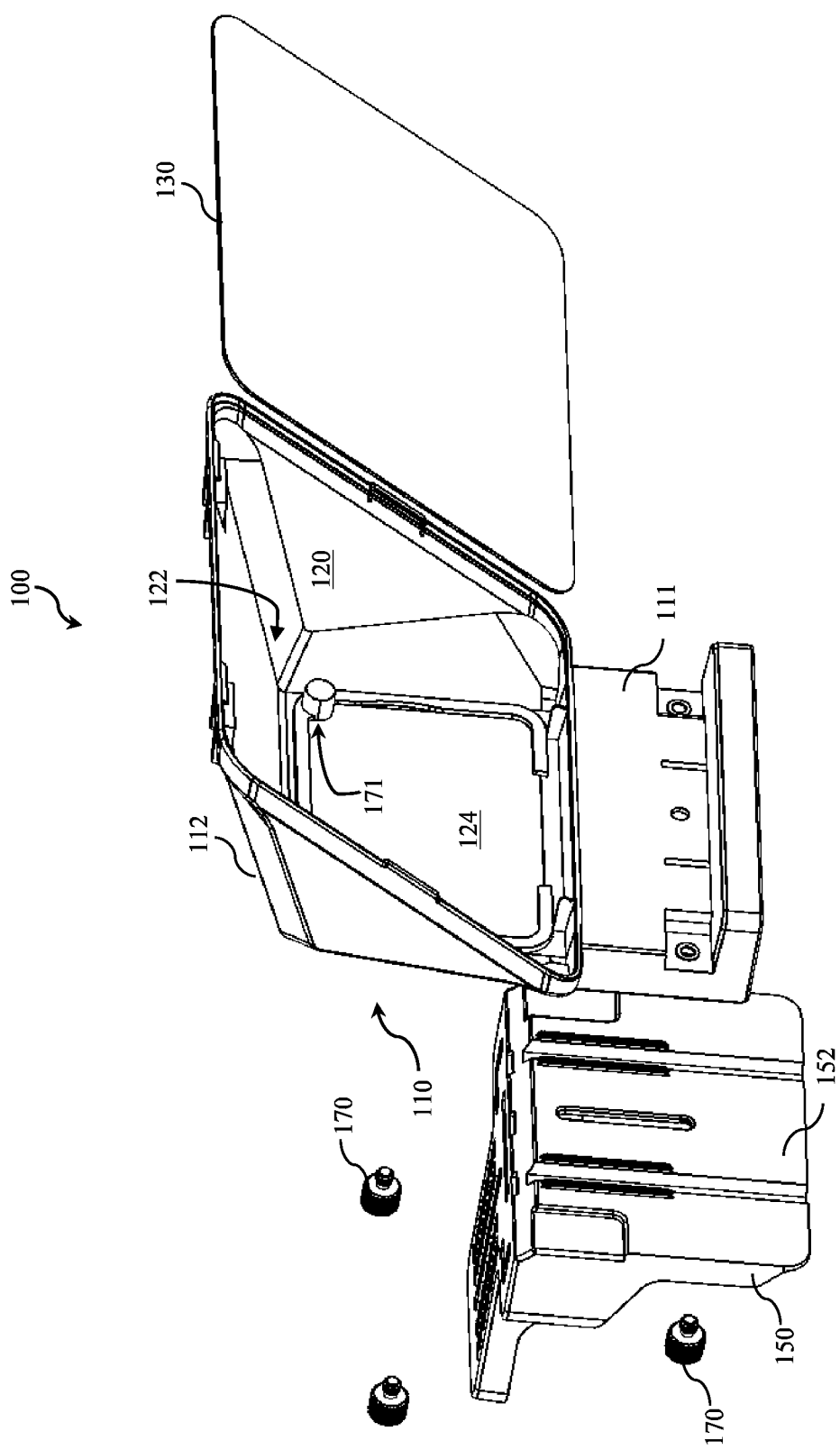
FIG. 4 is an exploded, perspective view from in front of a teleprompter assembly.
Figure 5:
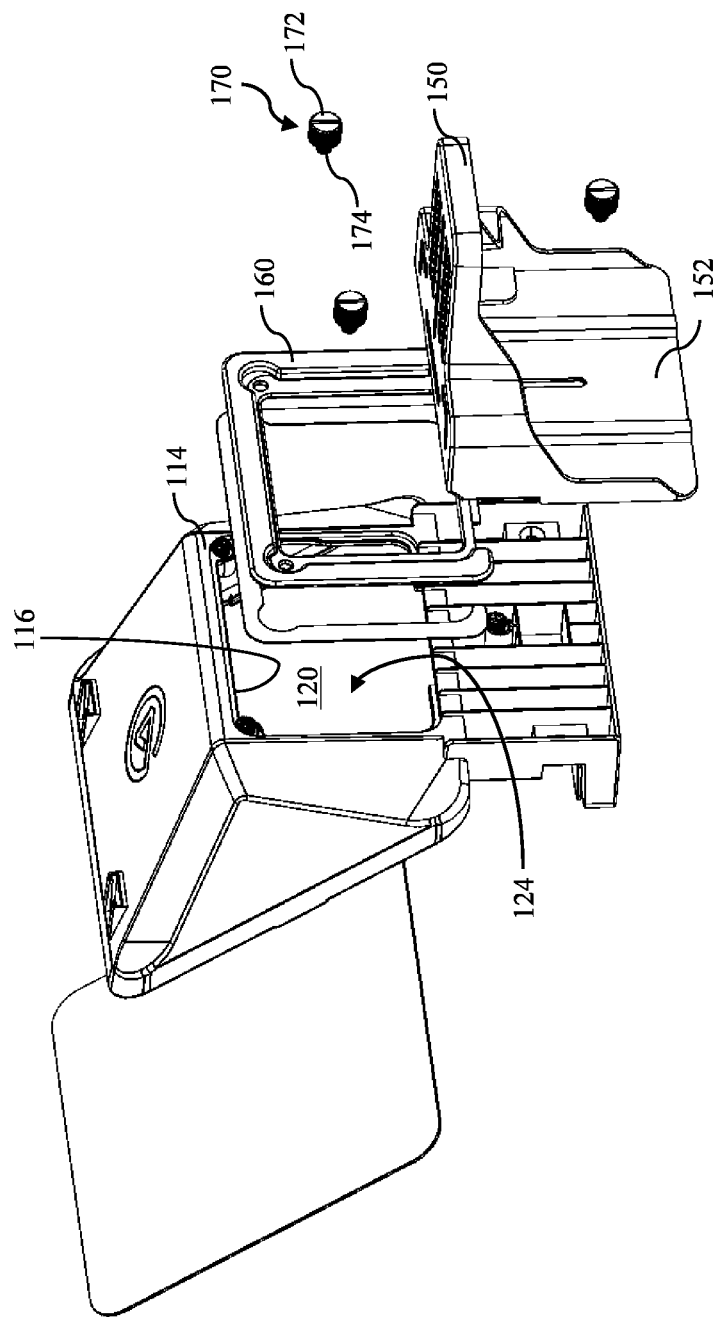
FIG. 5 is an exploded, perspective view from behind a teleprompter assembly as in FIG. 4.
Figure 5A:
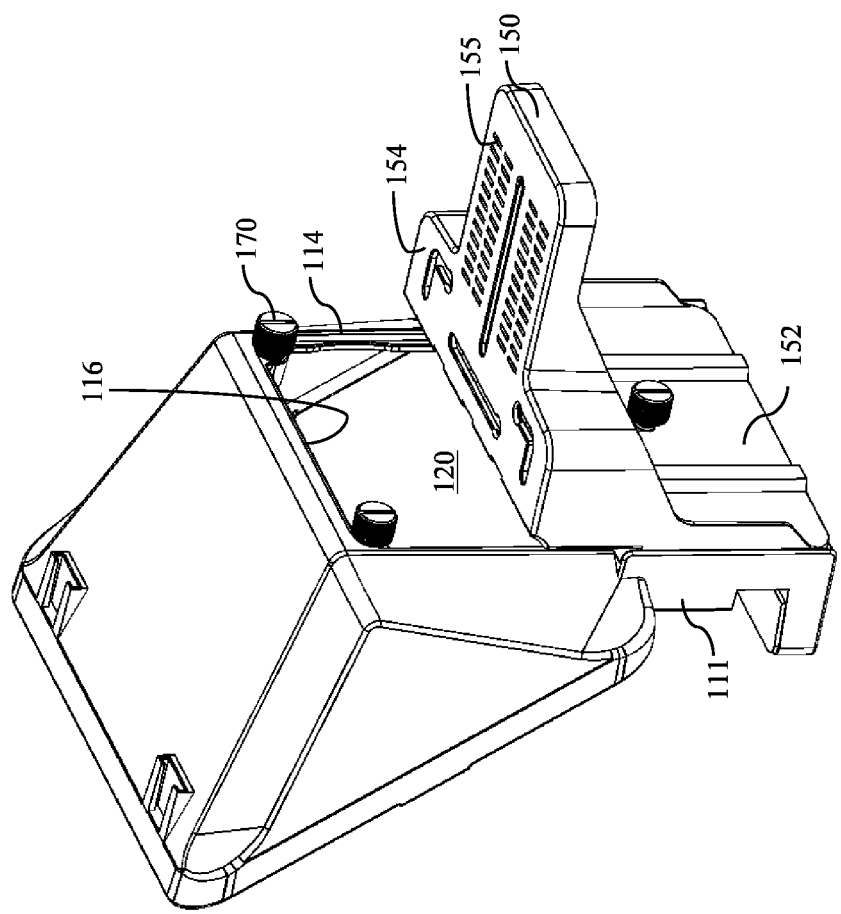
FIG. 5A is a perspective view from behind a teleprompter assembly as in FIGS. 4 and 5.
Figure 7:
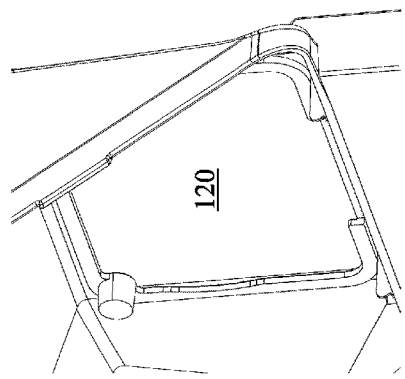
FIG. 7 is a perspective view from in front of and below a portion of a teleprompter housing as in FIG. 6.

Referring now to FIG. 1, a teleprompter embodiment is shown having features as generally described herein. The illustrated teleprompter 100 has a housing 110 defining an open interior region 120 (FIG. 3). The open interior region has a front face 122 (FIG. 4) and an opposed back face 124 (FIG. 5). Referring again to FIGS. 1 to 3, the housing also has a sidewall 112 defining an external boundary of the open interior region and extending longitudinally from the front face 122 to the back face 124 of the open interior region.

Figure 24:
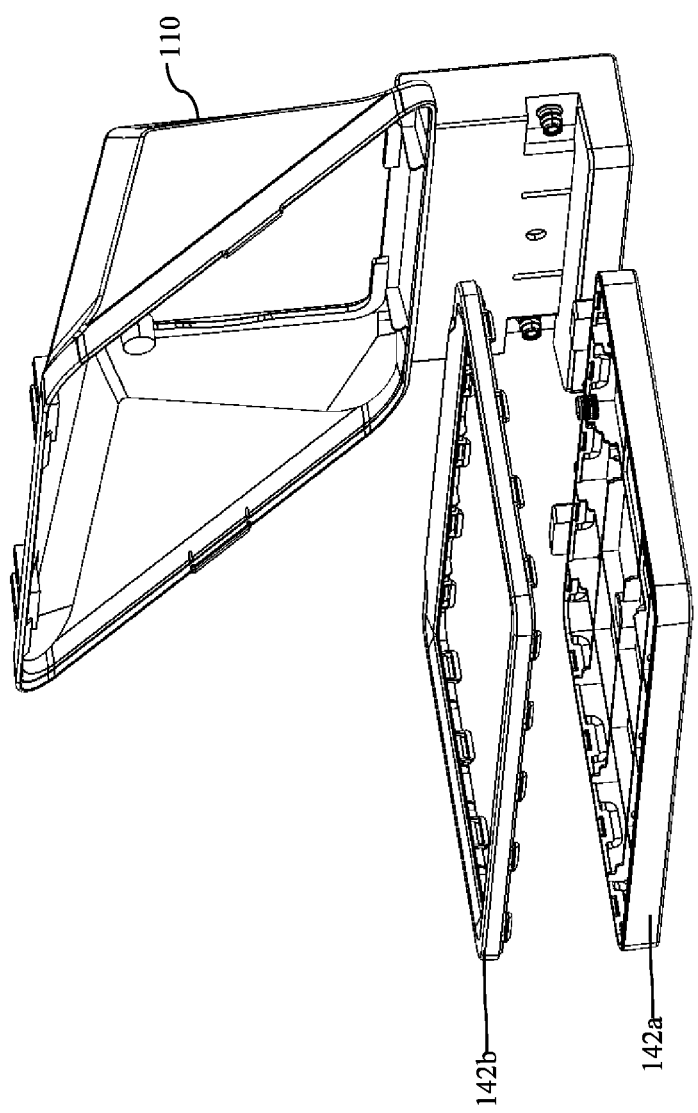
FIG. 24 is an exploded, front right perspective view of a teleprompter housing and monitor tray.
Figure 25:
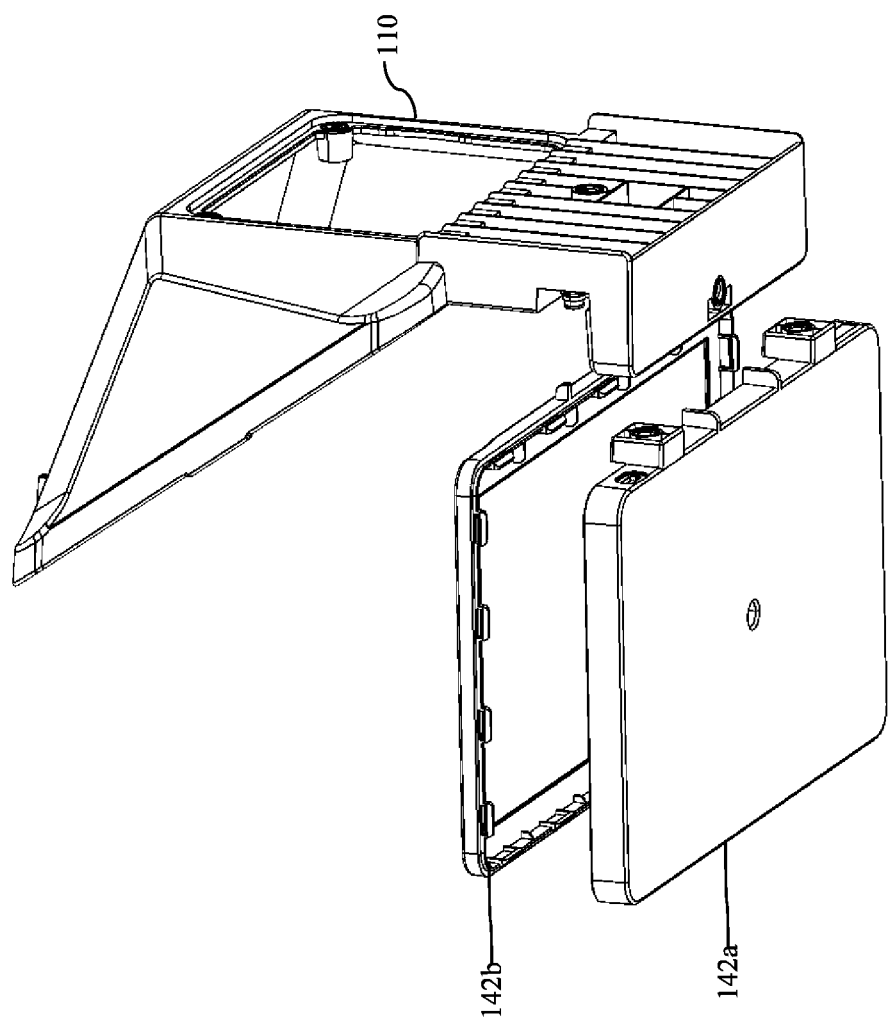
FIG. 25 is an exploded, perspective view from the right of and below a teleprompter housing and monitor tray as in FIG. 24.
Figure 27:
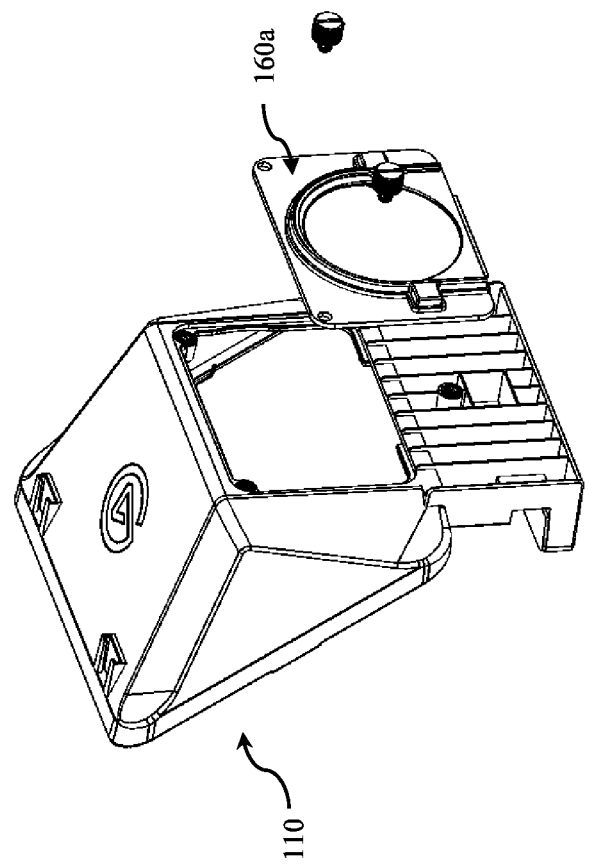
FIG. 27 is an exploded, perspective view from the right of and above a teleprompter housing and a backplate.
Figure 26:
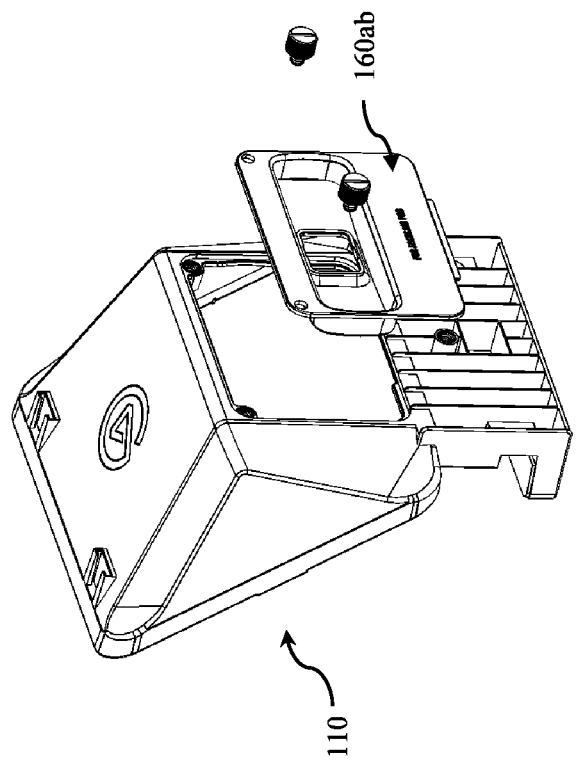
FIG. 26 is an exploded, perspective view from the right of and above a teleprompter housing and a backplate.

A display, e.g., a beam splitter, 130 is shown coupled with the housing 110 and extending across the front face of the open interior region 120. In FIG. 1, a monitor (or projector) 140 is oriented transversely relative to the display 130, e.g., below the display, in a manner that the monitor projects an image, e.g., text or other cues, onto the display. The teleprompter 100 includes a monitor tray 142 configured to support a monitor, e.g., a commercially available tablet, in a manner that causes the monitor's image to project onto the display 130, as by orienting the monitor transversely relative to the display from a position below the display. For example, as shown in FIGS. 24 and 25, the monitor tray 142 can have a base plate 142a and a frame 142b that matingly engages with the base plate, capturing a monitor 140 therebetween.

The display, in turn, reflects the incident light from the monitor, making the image from the monitor visible to a presenter in front of the teleprompter. For example, in FIG.

1, the beam splitter 130 is oriented at approximately 45 degrees relative to a plane defined by the screen of the monitor 140.

As described more fully below, a camera (not shown) can be mounted behind the beam splitter 130 and the camera's field of view can extend through the beam splitter. As a presenter reads text or other cues reflected by the beam splitter, the presenter's gaze will be directed toward the camera's lens, giving the impression that the presenter is looking into the camera. As incident light from the monitor is reflected toward the presenter by the beam splitter, the camera can capture an image of the presenter without being affected by the projected image from the monitor.

The housing also has a back wall 114 corresponding to the back face of the open interior region 120. As shown in FIG. 5, for example, the back wall 114 defines an opening 116. In some embodiments, the opening 116 provides a standard interface 118 (FIGS. 6 to 9) compatible with a variety of removable and interchangeable backplates. With such a standard interface, each interchangeable backplate can mate with the housing and prevent external light from entering the interior (which would diminish the presenter's perceived quality of the image reflected by the beam splitter). Further, each interchangeable backplate can provide a camera interface compatible with one or more selected camera types, configurations and features. By defining a standard interface 118 between the housing 110 and a variety of interchangeable backplates, e.g., a backplate as described in connection with one or more of FIGS. 10 to 15, the teleprompter 100 can be made compatible with a much larger variety of camera types, configurations and features than prior teleprompters having a fixed back-wall configuration. Moreover, a standard interface between the housing 110s and a variety of interchangeable backplates makes using cameras of different types, configurations and features more convenient for users, insofar as a user need only swap out a backplate to change cameras. In contrast, users often needed to swap prior teleprompters when the user needed to change cameras.

Figure 16:
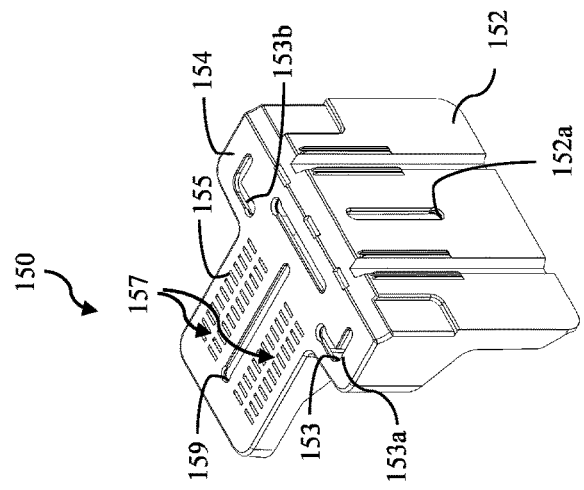
FIG. 16 is a front left perspective view from above a camera mount.
Figure 17:
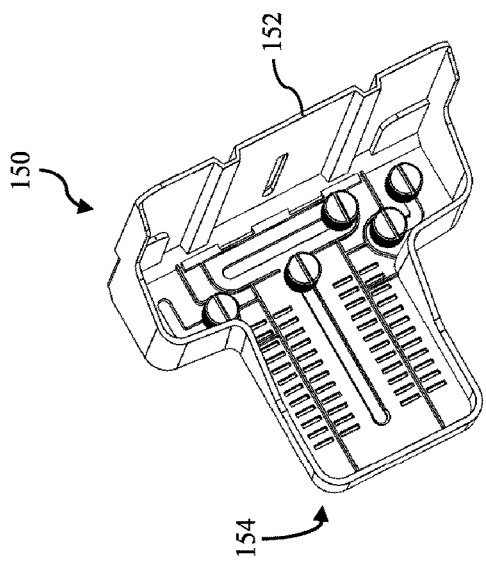
FIG. 17 a rear left perspective view from below a camera mount as in FIG. 16.
Figure 18:
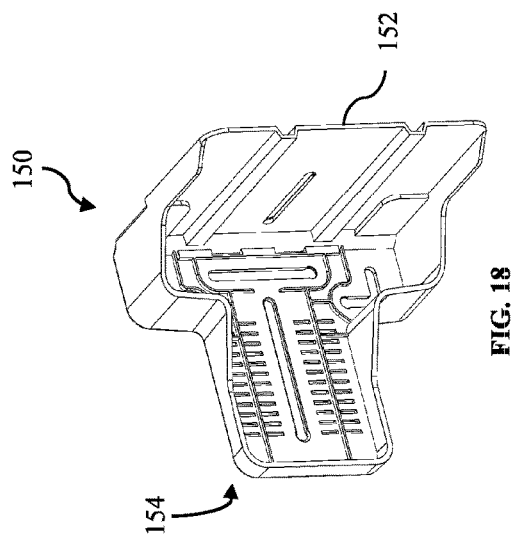
FIG. 18 a rear left perspective view from below a camera mount as in FIG. 16.
Figure 22:
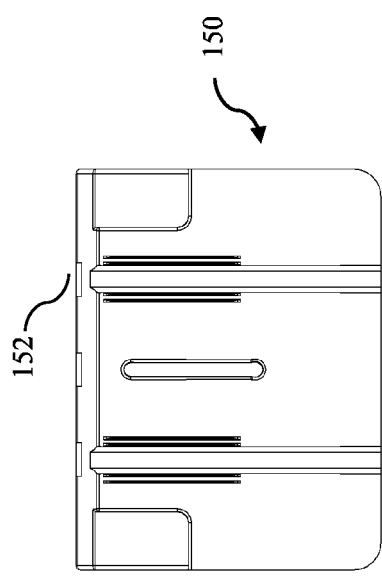
FIG. 22 is a front elevation view of a camera mount as in FIG. 16.
Figure 23:
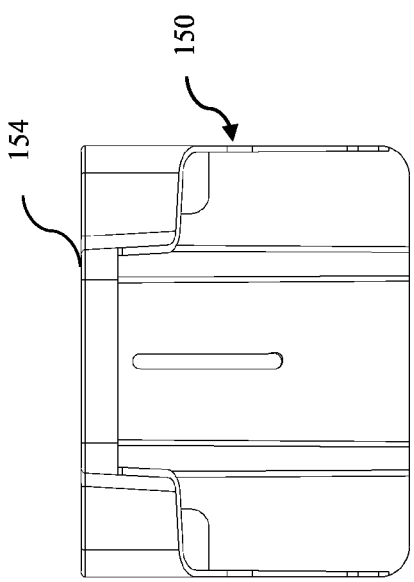
FIG. 23 is a rear elevation view of a camera mount as in FIG. 16.
Figure 21:
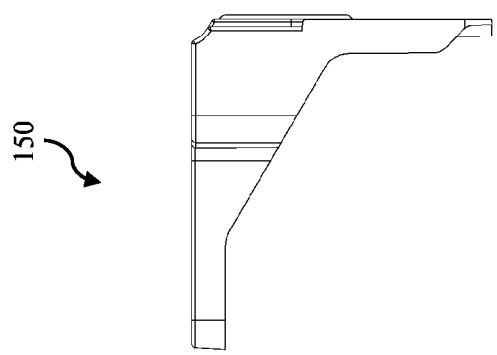
FIG. 21 is a left side elevation view of a camera mount as in FIG. 16.

In addition to the flexibility afforded by the interchangeable backplates, disclosed teleprompters incorporate an easily adaptable camera mount, providing users with an easily adjustable and customizable teleprompter platform. For example, as FIGS. 2 to 5 and 16 to 20 show, a camera mount 150 can be positioned rearward of the open interior region 120 and mounted to the housing 110. In the illustrated embodiment, the camera mount 150 provides a mounted camera with at least three degrees-of-freedom of movement. For example, the mount 150 (and a camera mounted thereto) can translate vertically relative to the housing 110 by virtue of the interface provided between the vertically oriented wall 152 of the mount and the opposed vertically oriented wall 111 of the housing. The horizontally oriented wall 154 of the mount can define one or more slots 155 or other camera-mounting features, providing two or more degrees-of-freedom of movement to a camera (not shown) relative to the mount 150. For example, a camera can continuously translate longitudinally and laterally in the slot 153 (FIG. 16). Alternatively, a camera can be mounted at any of several positions longitudinally and laterally among the plurality of slots forming the two arrays of slots 157 flanking the central, longitudinal slot 159. In combination with the vertical movement of the mount 150 relative to the housing 110, a camera (not shown) supported by the camera mount can have at least three degrees-of-freedom of movement relative to other components (e.g., the housing 110, the display 130, the open interior region 120) of the teleprompter 100.

Further details of disclosed principles are set forth below. Section II describes principles pertaining to teleprompter housings. Section III describes principles pertaining to interchangeable backplates compatible with some housing embodiments. Section IV describes principles related to camera mounts that provide substantial flexibility to users when mounting a camera to a teleprompter. Section V describes principles pertaining to assembly and use of disclosed teleprompters, and Section VI describes principles pertaining to other embodiments.

II. Teleprompter Housing

As noted, the teleprompter housing 110 shown in FIG. 1 defines an open interior region 120. A beam splitter 130 extends across the front face of the open interior region, supported by the housing. The housing 110 has a side wall 112 that defines an external, peripheral boundary of the open interior region. A back wall 114 of the housing defines an opening 116 and a contoured inner perimeter thereof. The opening 116 shown in FIGS. 6 to 9 has a contoured inner perimeter configured to mate with a backplate, e.g., backplate 160 (FIG. 5) having a complementarily contoured region. When assembled together, the housing 110 and the backplate 160 obscures light outside the housing from entering the open interior region 120 anywhere except through the beam splitter 130. This enhances the user's perception of the reflected image that is projected onto the beam splitter, as well as the image captured by the camera (not shown) mounted at the rear of the housing and backplate assembly.

A movable mount 150 coupled with the housing 110 permits at least one degree-of-freedom of movement (e.g., vertically in FIGS. 1 to 5) of the camera mount relative to the housing. As described more fully below, some mount embodiments provide additional options to adjust a camera's position and orientation relative to the housing, e.g., relative to a presenter's gaze when the presenter reads cues reflected by the beam splitter.

Referring now to FIGS. 6 to 9, the housing 110 can define an external major surface through which the opening 116 penetrates. In FIGS. 6 to 9, the back wall 114 of the housing 110 defines the opening 116. Nevertheless, in other embodiments, the opening 116 can extend around a bend or edge of the housing 110, causing the opening to span from, e.g., the backwall 114 to one or more of the sidewalls 112.

In any such embodiment, whether the opening is confined to a single wall or spans across two or more walls, the inner perimeter of the opening can provide a standard interface region 118 for mating and engaging with a backplate having complementary features. Each of a variety of backplates, in turn, can have a camera interface compatible with a selected range of camera configurations. Accordingly, a standard opening 116 defined by the housing 110 can be compatible with wide range of camera configurations, simply by, for example, swapping one backplate compatible with a first range of camera configurations for another backplate compatible with another (e.g., second) range of camera configurations.

By way of further example, a standard interface region defined by the opening 116 can include a contoured inner perimeter of the opening defining a shoulder 119 extending around and laterally outward of the opening. The shoulder 119 can be recessed from the external major surface 113 of the back wall 114. Stated differently, the housing wall can define a shoulder (or flange) 119 recessed from an external major surface 113 of the housing 110. The shoulder 119 can extend wholly or partially around the aperture of the opening 116, e.g., laterally inward from the periphery of the recess 117.

Figure 9:
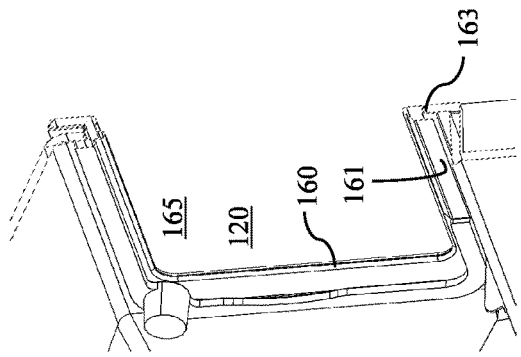
FIG. 9 is a cross-sectional view as in FIG. 8 with a back plate assembled with the teleprompter housing.
Figure 6:
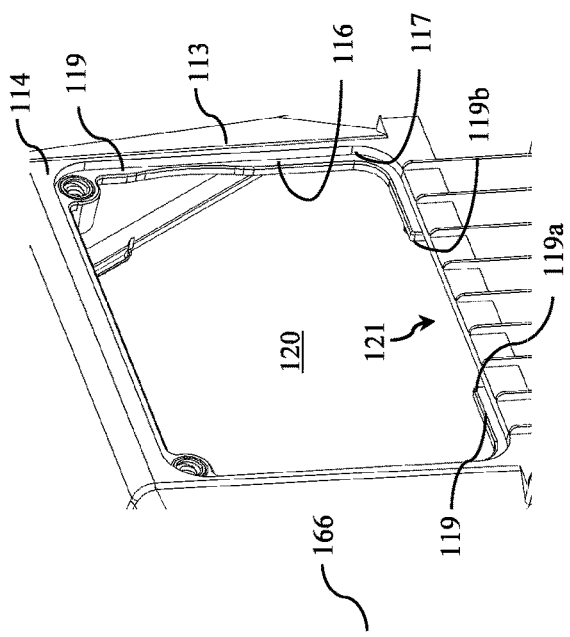
FIG. 6 is a perspective view from behind and right of a portion of a teleprompter housing.
Figure 8:
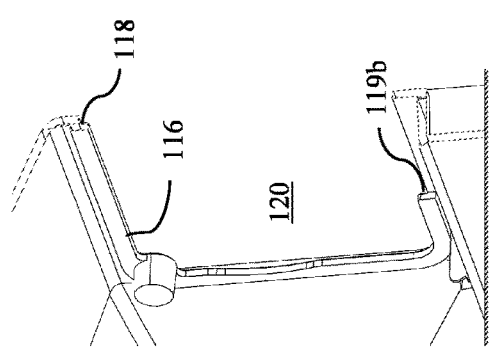
FIG. 8 is a cross-sectional view of the view in FIG. 7.

As shown in FIGS. 6 to 9, the shoulder 119 can extend partially around the opening 116 from a first end 119a to a second end 119b, leaving a gap 121 in the shoulder between the first end and the second end. Such a gap in the shoulder can provide a convenient means for aligning and securing a backplate to the housing. For example, as shown in FIG. 9, a removable back plate can define a tongue 161 that seats within the gap 121 and overlaps with the housing wall 114, providing a fulcrum 163 for the backplate to align with and to rotate into a mating position with the housing.

Other approaches for providing mating engagement between the backplate and the housing are possible, as will be understood by those of ordinary skill in the art, and this disclosure is not limited to the specific interface embodiments shown in the drawings.

III. Backplates

As briefly described above, a removable back plate 160 can define a contoured interface region 164 that is complementary with the contoured inner perimeter of the opening 116 defined by the backwall 114 of the housing 110. FIG. 9 shows, for example, that when the contoured perimeter of a backplate's interface region 163 is mated with the corresponding contoured perimeter of the opening 116 defined by the housing, the removable back plate can overlap with the back wall of the housing, obscuring external light from entering the interior region 120 of the housing. In FIGS. 9 to 15, the interface region 163 of each removable back plate 160, 160a and 160b defines a tongue 161 configured to seat within the gap 121 in the shoulder and to overlap with a corresponding region of the housing wall. The edge of the housing wall can provide a fulcrum 163 (FIG. 9) against which the tongue of the backplate 160, 160a, 160b can rest, and the gap in the shoulder can align the backplate with the back wall of the housing. Once the backplate is aligned and the tongue rests against the fulcrum, the backplate can rotate into a mating position with the housing. Such a mating position is shown by way of example in FIG. 9.

The teleprompter can include one or more fasteners to removably secure the backplate with the housing. For example, as FIG. 5 shows, a thumbscrew 170 can have an oversized head 172 that is graspable by a user and a threaded stud 174 extending longitudinally from the head. In corresponding fashion, the housing can define a threaded recess 171 (FIG. 4) having a thread corresponding to the thread of the thumbscrew 170. Further, the back plate 160, 160a, 160b can define a through-hole 166 that aligns with the threaded recess 171 of the housing when the back plate is in the mating position therewith, allowing the fastener to extend through the through-hole of the backplate and into the threaded recess.

With such complementary fastener, recess, and through-hole, the fastener and housing can threadably engage with, and threadably disengage from, each other, compressing the backplate therebetween. The oversized head of the thumbscrew can allow a user to easily thread and unthread the fastener with the housing, thereby securing the backplate with the housing, using only the user's hands, e.g., without resorting to other tools like screwdrivers, pliers or wrenches.

The removable back plate can also define an aperture through which the field-of-view of a camera can extend. That is to say, for example, that a camera can be positioned to "look through" the aperture defined by the backplate. Some embodiments of backplates, e.g., backplate 160b, define an aperture 165b that corresponds to a specific camera configuration. For example, some cameras have an interface, e.g., one or more mechanical features defined by the camera's body, that is complementary with a region of the backplate adjacent the backplate aperture. In other backplate embodiments, e.g., backplate 160, 160a, the backplate aperture 165, 165a is broader than a camera's field-of-view. With either such backplate embodiment, the removable back plate, when mated with the housing and in cooperation with the housing, can obscure light outside the housing from entering the open interior region through the back face thereof.

Figure 11:
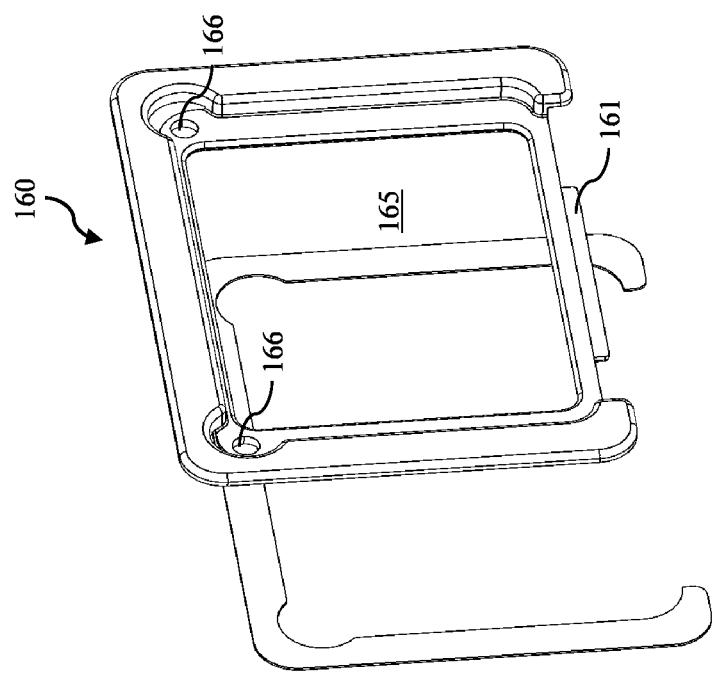
FIG. 11 is a rear right perspective view of a back plate as in FIG. 10.
Figure 10:
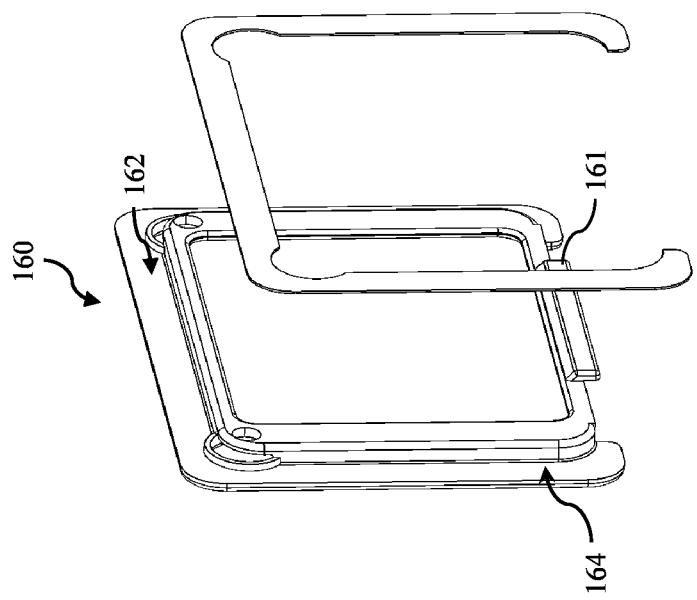
FIG. 10 is a front left perspective view of a back plate.

For example, referring now to FIGS. 1, 10 and 11, a "universal" backplate 160 can incorporate a shroud 169 or curtain that can cover or enclose the camera (not shown). For example, the back plate 160 (FIGS. 10 and 11) can define an outer perimeter region 162 to which the shroud couples. In some embodiments, as in FIG. 1, the shroud 169 extends longitudinally rearward of the teleprompter from the outer perimeter region 162 of the removable back plate. Suitable shrouds can be rigid or stiff, as made from plastic, metal or another, e.g., composite, material. In other embodiments, suitable shrouds can be in the form of a cape, bag, or curtain made from a conformable material, e.g., a fabric or a thin plastic sheet.

Figure 14:
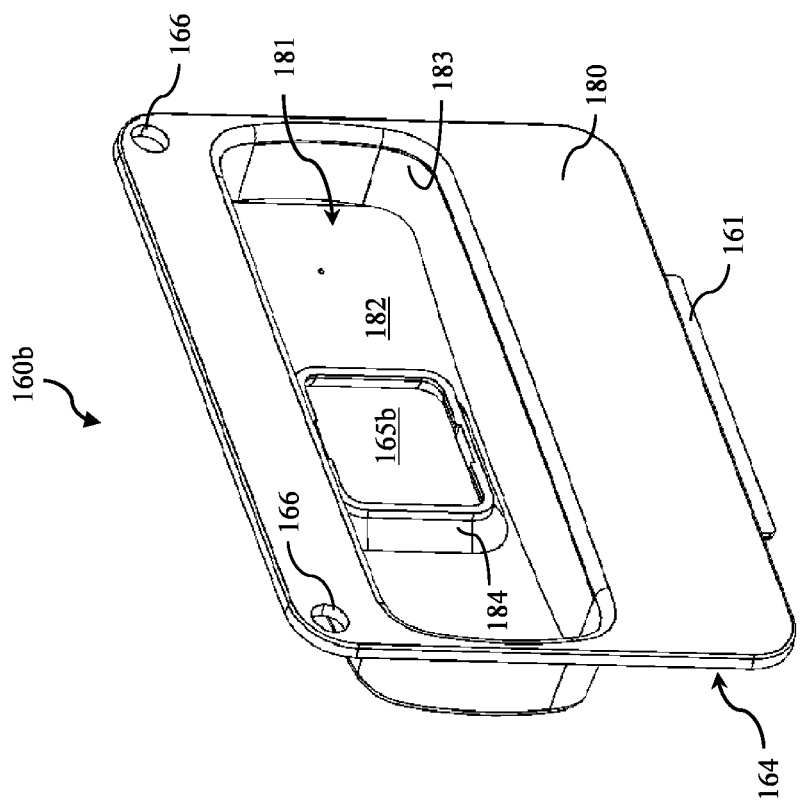
FIG. 14 is a front left perspective view of a back plate.
Figure 19:
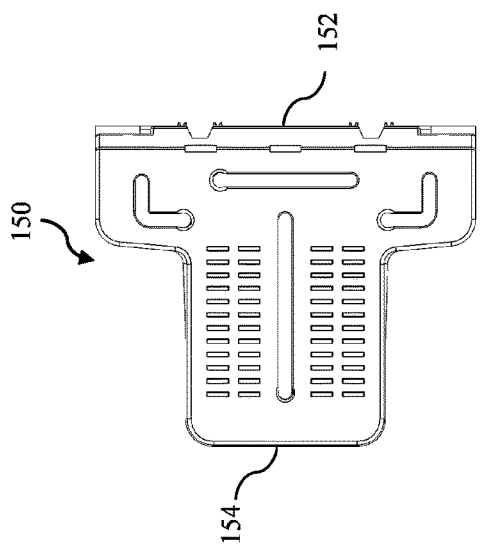
FIG. 19 is a top plan view of a camera mount as in FIG. 16.
Figure 20:
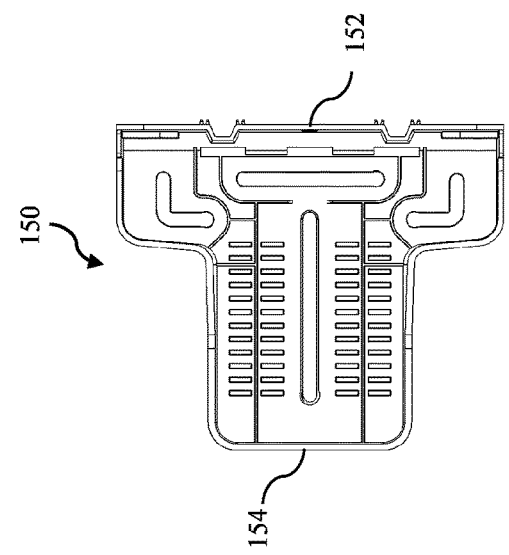
FIG. 20 is a bottom plan view of a camera mount as in FIG. 16.

As noted, some backplate embodiments are compatible with particular cameras or camera types. For example, a removable back plate 160b (FIGS. 14 and 15) can define an external major surface 180 positioned opposite the back face of the open interior region 120 when the removable back plate 160b is mated with the back wall 114 of the housing 110. The removable back plate 160a can also define a recess 181 from the external major surface 180. In FIG. 14, the recess has a floor 182. A perimeter wall 183 of the recess 181 can extend from the external major surface 180 to the floor 181. The floor 181 can define the aperture 165b of the removable back plate 160b. Further, the floor of the recess can define a shoulder 184 around the aperture 160b. In the embodiment shown in FIGS. 14 and 15, the shoulder 184 protrudes from the floor 182 of the recess in a direction away from the open interior region of the housing. Such a recess 181 can be configured to removably engage with a camera (not shown) having complementary features that retain the camera with the backplate 160b. Moreover, the camera can have an angle-of-view that extends through the aperture 165b and is aligned with a presenter's gaze when and while the back plate 160b is in the mating position with the housing 110 and the presenter reads text projected onto the display 130 from the monitor 140.

Figure 15:
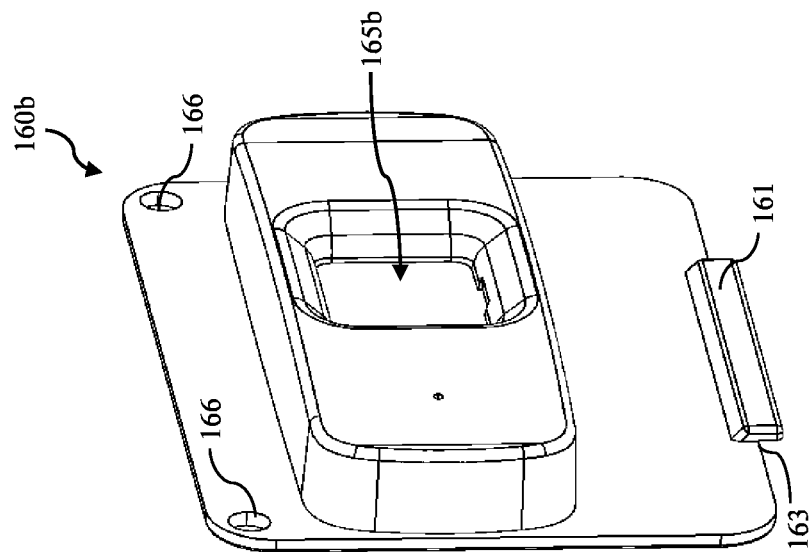
FIG. 15 is a rear right perspective view of a back plate as in FIG. 14.

In another embodiment, a removable back plate 160a can, like the embodiment shown in FIGS. 14 and 15, define an external major surface 180a positioned opposite the back face of the open interior region 120 when the removable back plate is mated with the back wall 114 of the housing 110. But unlike the embodiment shown in FIGS. 14 and 15, the removable backplate 160a shown in FIGS. 12 and 13 can incorporate a different camera interface. For example, the backplate 160a is compatible with a variety of so-called step-up rings that can be affixed to or otherwise engage with a variety of camera configurations, e.g., a variety of camera lens or body configurations (not shown). More particularly, the backplate 160a includes one or more (two in FIGS. 12 and 13) resiliently movable bosses 185 configured to urge inwardly relative to the aperture 165a in the back plate 160a from an outermost position to an innermost position relative to the aperture 165a.

The external major surface 180a of the backplate 160a can define a track, e.g., a recessed track 186, positioned outward of the aperture 165a. The recessed track 186 can extend partially around the aperture 165a. A back-plate cap 187 can define a channel 188, and the back plate cap can have a shape complementary to the recessed track 186. The back plate cap 187 can be positioned in the recessed track 186. The back plate 160a also can define an interior wall 189.

Figure 13:
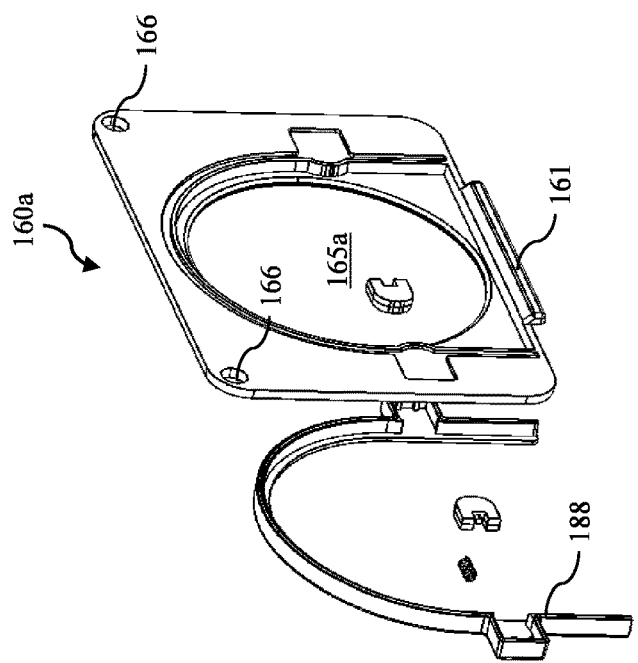
FIG. 13 is a rear right perspective view of a back plate as in FIG. 12.
Figure 12:
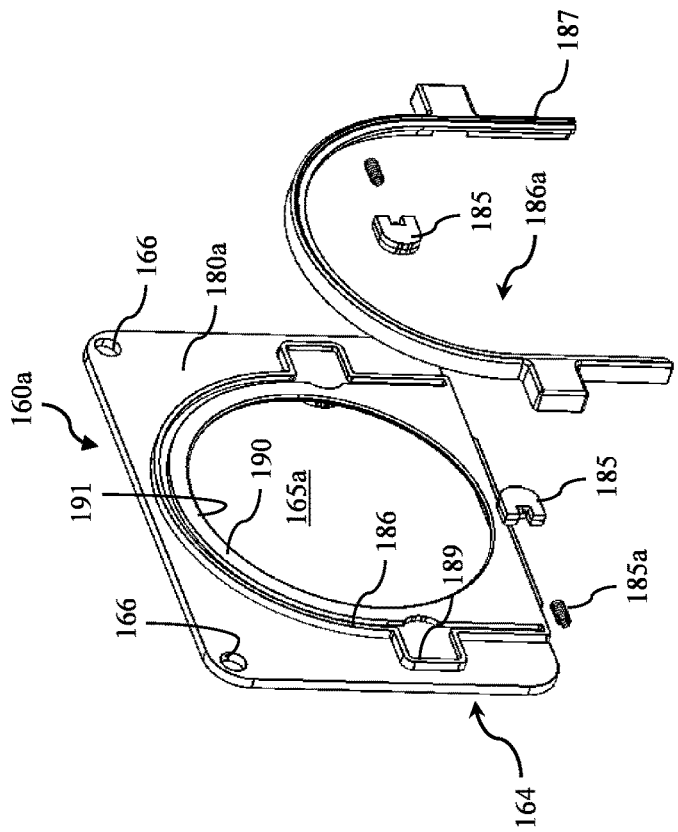
FIG. 12 is a front left perspective view of a back plate.

As shown in FIGS. 12 and 13, the recessed track can be a U-shaped track defining an interior region 186a. Such a U-shaped track can extend around the aperture 165a such that the aperture is positioned within the interior region of the U-shaped track.

A resiliently movable boss can be movably captured between external major surface 180a (e.g., in a region of the recessed track 186 and the back-plate cap 187 (e.g., in a portion of the channel 188). A resiliently compressible spring 185a can also positioned within the space between the channel defined by the back-plate cap and the recessed track. Further, the resiliently compressible spring 185a can be positioned between the resiliently movable boss 185 and the interior wall 189 such that the resiliently compressible spring urges the resiliently movable boss away from the internal wall, e.g., inward toward a central region of the aperture 165a.

The external major surface 180a of the back plate 160a can also define a flange region 190 extending around the aperture 165a, e.g., between an outer perimeter 191 of the aperture and the recessed track 186. Such a flange 190 can provide a mating surface for a step-up ring (not shown) having a correspondingly sized outer flange. For example, a step-up ring can have a generally annular profile, with an inner opening corresponding in shape with the aperture 165a defined by the backplate. In some embodiments, the inner opening of the step-up ring can be circular and in other embodiments it can be polygonal. In any event, the size of the inner opening can correspond to a contemplated camera's field-of-view and can be as large as will still provide the step-up ring with a flange surface to mate with the flange region 190 of the backplate. For step-up rings larger or smaller than a given backplate's aperture and flange will permit, a similar but different backplate can be swapped for the incompatible backplate.

The resiliently movable boss 185 and the step up ring can be complementarily configured so that the resiliently movable boss retains the step-up ring with the back plate when the outer flange of the step-up ring is mated with the flange region 190 of the back plate. For example, when the resiliently movable boss is in the innermost position, the boss 185 can rest in a detent defined by the step-up ring when the resiliently movable boss is in the innermost position, retaining the step-up ring with the back plate. In another embodiment, the resiliently movable boss 185 can overlap with the body of the step-up ring, such that the step-up ring is positioned between the resiliently movable boss and the flange region 190 of the back plate, retaining the step-up ring with the back plate.

Disclosed step-up rings can removably affix to a selected camera in such a manner that the camera's angle-of-view is aligned with a presenter's gaze when and while the back plate is in the mating position, the outer flange of the step-up ring is mated with the flange region of the back plate, and the presenter reads text projected onto the display from the monitor.

IV. Camera Mounts

As noted above, a camera mount can provide a camera with several, e.g., three or more degrees-of-freedom of movement. For example, referring now to FIGS. 16 to 20, the mount 150 has a vertically oriented wall 152 and a slot 152a through which the stud 174 (FIG. 5) of a thumbscrew 170 extends as it (the thumbscrew) threadably engages with the rear wall 111 of the housing (FIG. 5). The major surface defined by the vertically oriented wall of the mount can slide vertically relative to the housing from an upper extent corresponding to the lower end of the slot 152a to a lower extent corresponding to the upper end of the slot, providing one degree-of-freedom of movement.

The camera mount 150 also has a horizontally oriented wall 154 extending longitudinally rearward from the vertically oriented wall 152. The horizontally oriented wall 154 provides at least two degrees-of-freedom of camera movement relative to the mount (e.g., longitudinally and laterally in a horizontal plane). For example, the horizontally oriented wall 154 can define one or slotted tracks that permit a camera to move relative to the major surface of the wall 154.

The mount 150 can also include a thumbscrew 170 that extends transversely through a selected one or more of the slotted tracks 153, 155, 157, 159 and above the major surface of the horizontally oriented wall 154, providing a mounting location for a camera. The fastener is movable to and fro within the slotted track, providing an adjustable camera-mounting location. As shown in FIG. 16, one or more of the slotted tracks 159 can be straight and another one or more of the slotted tracks 153 can be L-shaped, e.g., with a first segment 153a extending longitudinally relative to the teleprompter and a second segment 153b extending transverse to the first segment. Other track configurations are possible, e.g., T-shaped, U-shaped, etc. As well, the mount 150 can define a plurality of slots or tracks arranged in one or more arrays, as shown by the arrays 157 flanking the longitudinal, elongate track 159 in FIG. 16.

Referring again to FIGS. 10-15, the aperture 165, 165a, 165b through each respective backplate can have an area centroid (e.g., a "center" of an irregular polygon, or a center for a circle, square or other regular polygon). A vertical plane can be defined that is orthogonal to the major surface of the horizontally extending wall 154 and that passes through the area centroid of the aperture 165, 165a, 165b. With some track embodiments, e.g., as in FIG. 16, a segment 153a, 153b of a slotted track 153 or a slotted track 155 can be laterally offset from the plane. Other track segments, can be aligned with, e.g., as with the track 159. Some track segments, e.g., track 155 and segment 153b are transverse to such a plane while other track segments are parallel with the plane, e.g., as with the segment 153a. For example, a slotted track can define a longitudinal axis lying within the plane or parallel to but offset from the plane. Other track segments have a longitudinal axis transverse to the plane.

The combination of vertical movement of the mount and horizontal movement of a camera longitudinally and laterally relative to the mount provides at least three degrees-of-freedom of camera movement relative to the teleprompter housing. As well, some mount embodiments have couplings that provide cameras with one or more additional degrees-of-freedom, e.g., in rotation. Such camera mounts provide users with the ability to align a field-of-view of the camera to extend from the aperture of the removable back plate, through the open interior region of the housing and through the display to align with a user's gaze upon the teleprompter's display.

V. Assembly and Operation

Exemplary methods of assembly and operation of disclosed teleprompters are now described. During setup of the teleprompter, a backplate that is compatible with a user's preferred camera can be selected from among a plurality of interchangeable back plates, e.g., in accordance with one or more features of the camera. Further, the backplate can be retained in the mated arrangement with the backwall of the housing with a fastener, e.g., one or more thumbscrews. The backplate can be coupled with the camera. For example, a step-up plate can be removably affixed to the camera and the step-up plate can be coupled with the removable back plate, or vice-versal. Similarly, the camera can be coupled with the backplate before the backplate is mate with the housing of the teleprompter, or vice-versa.

In some embodiments, a user can select a "universal" backplate, e.g., as with the backplate 160 in FIGS. 10 and 11.

The user can also mount the preferred camera to the teleprompter's camera mount, e.g., the camera mount 150, at a selected position and in a selected orientation relative to the horizontally extending wall 154. The vertical position of the camera mount can be selected, as well as the position and orientation of the camera relative to the horizontally extending wall can be user selected. In summary, the position and orientation of the camera mounting can be selected so that the camera's field-of-view extends through the aperture of the removable back plate, through the open interior region of the housing and through the display. In a preferred approach, an axis of camera's field-of-view aligns with a presenter's gaze upon the display when and while the presenter is viewing or reading cues, texts or other prompts on the display.

Once the camera has been mounted in the selected position and orientation relative to the presenter's intended or likely gaze, text or another image cue can be projected on to the display, e.g., by the monitor 140. In some cases, the position, the orientation, or both, of the camera can be adjusted responsive to a change in the user's gaze upon the display. For example, the mount's vertical location can be adjusted, or the camera's horizontal (lateral or longitudinal) position can be adjusted.

VI. Other Embodiments

The examples described above generally concern teleprompter systems and methods that can be used with a wide variety of cameras while improving alignment of a presenter's gaze with a camera's angle-of-view with the variety of cameras, as compared to prior teleprompters. This description is provided to enable a person skilled in the art to make or use the disclosed principles. Embodiments other than those described above in detail are contemplated based on the principles disclosed herein, together with any attendant changes in configurations of the respective apparatus or changes in order of method acts described herein, without departing from the spirit or scope of this disclosure. Various modifications to the examples described herein will be readily apparent to those skilled in the art.

For example, a lapped interface between interchangeable backplates and a shoulder defined by the housing, as described above, is but one possible embodiment of a complementary interface between a housing and a plate. Similarly, the opening defined by the housing is but one example of such an opening and those of ordinary skill in the art will appreciate the wide variety of interface configurations that are possible using disclosed principles. For example, as but one other exemplary embodiment, the housing and the plate can define a complementary rail-and-track interface, e.g., in which the housing defines a plurality of studs or bosses and the plate defines one or more channels (or tracks) that slidably engage with one or more of the studs or bosses of the housing, or vice-versa.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features and acts claimed herein. Accordingly, neither the claims nor this detailed description shall be construed in a limiting sense, and following a review of this disclosure, those of ordinary skill in the art will appreciate the wide variety of teleprompters, and related methods and systems that can be devised using the various concepts described herein. Moreover, nothing disclosed herein is intended to be dedicated to the public regardless of whether such disclosure is explicitly recited in the claims. No claim feature is to be construed under the provisions of 35 USC 112 (f), unless the feature is expressly recited using the phrase "means for" or "step for".

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more". Further, in view of the many possible embodiments to which the disclosed principles can be applied, I reserve the right to claim any and all combinations of features and technologies described herein as understood by a person of ordinary skill in the art, including the right to claim, for example, all that comes within the scope and spirit of the foregoing description, as well as the combinations recited, literally and equivalently, in any claims presented anytime throughout prosecution of this application or any application claiming benefit of or priority from this application, and more particularly but not exclusively in the claims appended hereto.

I claim:

1. A method of operating a teleprompter comprising a display, a camera mount, and a housing defining an open interior region, the housing having a backwall partially defining an opening extending therethrough and a boundary of the interior region, wherein the housing defines an interface region extending at least partially around the opening, wherein the teleprompter further comprises a removable backplate having an interface region being so matable with the interface region of the housing as to obscure light external to the housing from entering the open interior region through an interface between the interface region of the housing and the interface region of the backplate, wherein the backplate defines an aperture, the method comprising:
- mounting a camera to the camera mount at a selected position and in a selected orientation relative thereto in a manner that extends the camera's field-of-view through the aperture of the removable back plate, through the open interior region of the housing and through the display in alignment with a user's gaze upon the display;
- projecting text or another image cue on the display.

2. The method of operating a teleprompter according to claim 1, further comprising adjusting the selected orientation of the camera responsive to a change in the user's gaze upon the display.

3. The method of operating a teleprompter according to claim 1, further comprising:
- selecting the removable backplate from among a plurality of removable backplates in accordance with one or more features of the camera; and
- coupling the removable backplate with the backwall of the housing.

4. The method of operating a teleprompter according to claim 3, wherein the act of coupling the removable backplate with the backwall of the housing comprises mating the interface region of the backplate with the interface region of housing and retaining the backplate in the mated arrangement with the backwall of the housing with a fastener.

5. The method of operating a teleprompter according to claim 1, further comprising removably affixing a step-up plate to the camera and coupling the step-up plate with the removable back plate.

6. A teleprompter, comprising:
- a housing defining an open interior region, the open interior region having a back face and an opposed front face, wherein the housing has at least one side wall defining an external boundary of the open interior region and extending longitudinally from the front face to the back face, the housing further having a back wall corresponding to the back face of the open interior region, wherein the back wall of the housing defines an opening and a contoured inner perimeter thereof, wherein the back wall of the housing is configured to mate with a removable back plate defining an interface region having a contoured outer perimeter so complementary with the contoured inner perimeter of the opening defined by the back wall of the housing that when the contoured outer perimeter of the interface region is mated therewith, the removable back plate, in cooperation with the back wall of the housing, obscures light outside the housing from entering the open interior region through the back face thereof, the removable back plate defining an aperture;
- a display coupled with the housing and extending across the front face of the open interior region, defining an external boundary of the open interior region;
- a monitor mount configured to support a monitor and to orient the monitor transversely relative to the display;
- a camera mount movably so coupled with the housing as to permit at least one degree-of-freedom of movement of the camera mount relative to the housing, the camera mount further comprising one or more adjustable couplings configured to provide at least two degrees-of-freedom of camera movement relative thereto and to so retain the camera in a selected position and orientation relative thereto as to align a field-of-view of the camera to extend from the aperture of the removable back plate, through the open interior region of the housing and through the display to align with a user's gaze upon the display.

7. The teleprompter according to claim 6, wherein the back wall comprises an external major surface and the contoured inner perimeter comprises a shoulder extending around, and laterally outward of, the opening, wherein the shoulder is recessed from the external major surface of the back wall.

8. The teleprompter according to claim 7, wherein the shoulder extends partially around the opening defined by the back plate from a first end to a second end, leaving a gap in the shoulder between the first end and the second end.

9. The teleprompter according to claim 8, wherein the interface surface of the removable back plate defines a tongue configured to seat within the gap in the shoulder, providing a fulcrum for the backplate to align with the back wall of the housing and to rotate into a mating position therewith.

10. The teleprompter according to claim 9, wherein the teleprompter further comprises a fastener defining a thread, wherein the housing defines a threaded recess having a corresponding thread so complementary with the thread of the fastener as to permit the fastener and housing to threadably engage with, and to threadably disengage from, each other, wherein the back plate further defines an opening so aligned with the threaded recess of the housing when the back plate is in the mating position therewith that the fastener can extend through the opening of the backplate and into the threaded recess.

11. The teleprompter according to claim 10, wherein the fastener and the tongue retain the back plate in the mating position with the back wall of the housing when the tongue of the back plate is seated within the gap in the shoulder, the fastener extends through the opening of the backplate, and the fastener is threadably engaged with the threaded recess of the housing.

12. The teleprompter according to claim 6, further comprising the removable back plate, wherein the removable back plate further comprises an outer perimeter region, wherein the teleprompter further comprises a shroud coupled with the outer perimeter region of the back plate.

13. The teleprompter according to claim 12, wherein the shroud extends longitudinally rearward of the teleprompter from the outer perimeter region of the removable back plate.

14. The teleprompter according to claim 6, further comprising the removable back plate, wherein the removable back plate defines an external major surface positioned opposite the rear back face of the open interior region when the removable back plate is mated with the back wall of the housing, wherein the removable back plate defines a recess from the external major surface, the recess having a floor having a perimeter and recessed wall extending around the perimeter of the floor from the external major surface to the floor, wherein the floor of the recess defines aperture of the removable back plate.

15. The teleprompter according to claim 14, wherein the floor of the recess defines a shoulder around the aperture, wherein the shoulder protrudes from the floor of the recess in a direction away from the open interior region of the housing.

16. The teleprompter according to claim 14, wherein the recess is further configured to removably engage with a camera having an angle-of-view in such a manner that the camera's angle-of-view extends through the aperture and is aligned with a presenter's gaze when and while the back plate is in the mating position and the presenter reads text projected onto the display from the monitor.

17. The teleprompter according to claim 6, further comprising the removable back plate, wherein the removable back plate defines an external major surface positioned opposite the rear back face of the open interior region when the removable back plate is mated with the back wall of the housing, the removable backplate further comprising a resiliently movable boss configured to urge inwardly relative to the aperture in the back plate from an outermost position to an innermost position.

18. The teleprompter according to claim 17, wherein the external major surface defines a recessed track positioned outward of the aperture, the recessed track extending partially around the aperture, the back plate further comprising a back-plate cap having a channel therein, the back plate cap having a shape complementary to the recessed track and positioned therein, wherein the resiliently movable boss is movably captured between the recessed track of the external major surface and the channel of the back-plate cap.

19. The teleprompter according to claim 18, wherein the removable back plate further comprises an interior wall and a resiliently compressible spring positioned within the channel defined by the back-plate cap, the resiliently compressible spring being positioned between the resiliently movable boss and the interior wall, such that the resiliently compressible spring urges the resiliently movable boss away from the internal wall.

20. The teleprompter according to claim 19, wherein the recessed track is a U-shaped track defining an interior region, wherein the U-shaped track extends around the aperture of the back plate such that the aperture is positioned within the interior region of the U-shaped track.

21. The teleprompter according to claim 19, wherein the external major surface of the back plate defines a flange region extending around the aperture of the back plate between an outer perimeter of the aperture and the recessed track, wherein the teleprompter further comprises a step-up ring having an outer flange sized to mate with the flange region of the back plate, wherein the resiliently movable boss and the step up ring are so complementarily configured that the resiliently movable boss retains the step-up ring with the back plate when the outer flange of the step-up ring is mated with the flange region of the back plate and the resiliently movable boss is in the innermost position.

22. The teleprompter according to claim 21, wherein the step-up ring defines a detent and, in the innermost position, the resiliently movable boss is positioned within the detent of the step-up ring, thereby retaining the step-up ring with the back plate.

23. The teleprompter according to claim 21, wherein the step-up ring is positioned between the flange region of the external major surface and the resiliently movable boss when the resiliently movable boss is in the innermost position, thereby retaining the step-up ring with the back plate.

24. The teleprompter according to claim 21, Wherein the step-up ring is further configured to removably affix to a camera having an angle-of-view in such a manner that the camera's angle-of-view is aligned with a presenter's gaze when and while the back plate is in the mating position, the outer flange of the step-up ring is mated with the flange region of the back plate, and the presenter reads text projected onto the display from the monitor.

25. The teleprompter according to claim 6, wherein the camera mount comprises a first major surface and a second major surface oriented transverse relative to the first major surface, the first major surface being movably couplable with the housing, wherein second major surface defines a slotted track.

26. The teleprompter according to claim 25, wherein the slotted track is a first slotted track, wherein the second major surface defines one or more other slotted tracks.

27. The teleprompter according to claim 25, wherein the first major surface is oriented substantially vertically when and while the camera mount is coupled with the teleprompter, wherein the second major surface is oriented substantially horizontally when and while the camera mount is coupled with the teleprompter.

28. The teleprompter according to claim 25, wherein camera mount further comprises a fastener comprising a body and a threaded stud, the threaded stud sized to extend transversely through the slotted track and from the second major surface, providing a mounting location for a camera.

29. The teleprompter according to claim 28, wherein the fastener is movable to and fro within the slotted track, providing an adjustable camera-mounting location.

30. The teleprompter according to claim 25, wherein the slotted track is straight.

31. The teleprompter according to claim 25, wherein the slotted track is an L-shaped slotted track having a first segment extending longitudinally relative to the teleprompter and a second segment extending transverse to the first segment.

32. The teleprompter according to claim 31, wherein the aperture through the backplate has a centroid and the first segment of the slotted track is laterally offset from a plane oriented orthogonally to the second major surface of the camera mount and extending through the centroid of the aperture.

33. The teleprompter according to claim 31, wherein the aperture through the backplate has a centroid and the first segment of the slotted track defines a longitudinal axis lying within a plane oriented orthogonally to the second major surface of the camera mount and extending through the centroid of the aperture.

* * * * *